US006523466B1

(12) United States Patent
King et al.

(10) Patent No.: US 6,523,466 B1
(45) Date of Patent: Feb. 25, 2003

(54) CHECKERBOARD SHEAR VOLUME REDUCTION SYSTEM

(75) Inventors: James Mitchell King, Deep River (CA); Clair Arthur Cox, Deep River (CA)

(73) Assignee: Atomic Energy of Canada Limited, Mississauga (CA)

( * ) Notice: Subject to any disclaimer, the term of this patent is extended or adjusted under 35 U.S.C. 154(b) by 0 days.

(21) Appl. No.: 09/886,232

(22) Filed: Jun. 20, 2001

(51) Int. Cl.[7] ................................................ B30B 9/00
(52) U.S. Cl. ..................... 100/98 R; 100/39; 100/215; 100/218
(58) Field of Search ................ 100/98 R, 39, 100/215, 218; 72/325, 328; 83/687, 691, 930; 588/1

(56) References Cited

U.S. PATENT DOCUMENTS

| | | | |
|---|---|---|---|
| 1,398,320 A | 11/1921 | Dunsworth | |
| 1,447,247 A | 3/1923 | Hilsdorf | |
| 2,721,613 A | 10/1955 | Rice | |
| 3,695,174 A | * 10/1972 | Tezuka | ..................... 100/139 |
| 3,763,770 A | * 10/1973 | Ehrman et al. | ............. 100/215 |
| 4,108,032 A | 8/1978 | Scheib et al. | ................. 83/106 |
| 4,186,657 A | * 2/1980 | Weil et al. | ................... 100/295 |
| 4,434,092 A | 2/1984 | Mary | ......................... 252/626 |
| 4,664,872 A | * 5/1987 | Kiewitz et al. | ............. 209/576 |
| 5,297,461 A | 3/1994 | Hirakawa et al. | ............. 83/304 |
| 5,633,903 A | 5/1997 | Dietrich | ..................... 376/260 |

* cited by examiner

*Primary Examiner*—Allen Ostrager
*Assistant Examiner*—Jimmy Nguyen
(74) *Attorney, Agent, or Firm*—Pennie & Edmonds LLP (57) ABSTRACT

A method and apparatus for reducing the volume of a cylindrical tube for disposal by crushing flat and then shearing into small coupons. Shearing is accomplished by opposed dies having a checkerboard grid of cutting edges. The resulting coupons are preferably substantially square in shape. The invention is particularly useful for reducing the storage volume of irradiated radioactive pressure tubes from a nuclear reactor.

33 Claims, 9 Drawing Sheets

CHECKERBOARD SHEAR VOLUME REDUCTION SYSTEM

The present invention relates to a method and apparatus for the volume reduction and disposal of material, the primary application involving irradiated radioactive material. In particular, the present invention relates to method and apparatus for the removal, processing and disposal of pressure tubes and calandria tubes from CANDU® nuclear reactors.

BACKGROUND OF THE INVENTION

In order to extend the operating life of CANDU® nuclear reactors, it may be necessary to undertake large scale fuel channel replacement. One of the key processes of large scale fuel channel replacement is the removal of the highly radioactive pressure tubes and calandria tubes from the reactor core.

The conventional process involves the removal of the approximately 6 meter long pressure tubes and calandria tubes whole, or cut in half at their midpoint. The reactor vault, on the side that the tubes are removed to, must be evacuated of personnel, which prevents parallel activities from occurring and thereby prolonging the work schedule. A very large and heavy lead-filled flask is used to transport the pressure tubes out of the reactor vault to disposal. It is a difficult and time consuming task to move this size of flask through the containment structure of a CANDUO® type nuclear reactor, requiring cranes or other heavy material handling equipment and personnel evacuation from the work area. This interrupts material, equipment and personnel movement for the whole reactor outage and is a major detriment in scheduling and critical path considerations. Thus, it is desirable to make the method of pressure tube and calandria tube removal and disposal more economically attractive.

SUMMARY OF THE INVENTION

The present invention provides a method and apparatus for reducing the volume of a cylindrical tube for disposal by the process of crushing flat and then shearing into small coupons. Shearing is preferably accomplished on a checkerboard grid of multiple intersecting planes and the resulting coupons are preferably substantially square in shape.

In accordance with the present invention there is provided an apparatus for reducing the disposal volume of an elongated cylindrical tube comprising a pair of inwardly opposed die blocks, means for moving said die blocks between an open position and a closed position, and feeder means for positioning an end portion of said cylindrical tube between said die blocks in said open position, each of said die blocks comprising an array of raised cutters and recessed pockets, each of said cutters of one of said die blocks adapted to be closely received into an opposed pocket of the other of said die blocks when said die blocks are moved from said open position to said closed position to sequentially crush said end portion to a substantially flat configuration and sever it into a plurality of coupons.

In accordance with another aspect of the invention, there is provided an apparatus for reducing the disposal volume of irradiated radioactive nuclear reactor cylindrical tubes comprising a movable mounting base adapted to be operatively positioned adjacent a reactor face at selected tube positions; a feeder unit mounted on said base for engaging and advancing said selected tube out of said reactor; a press assembly mounted on said base comprising a pair of inwardly opposed die blocks and means for moving said die blocks between an open position and a closed position, said die blocks being positioned to receive therebetween in said open position the end portion of said selected tube, each of said die blocks comprising an array of raised cutters and recessed pockets, each of said cutters of one of said die blocks adapted to be closely received into an opposed pocket of the other of said die blocks, whereby when said die blocks are moved from said open position to said closed position, said end portion is sequentially crushed to a substantially flat configuration and severed into a plurality of coupons.

In accordance with another aspect of the invention, there is provided a method for reducing the disposal volume of an elongated cylindrical tube comprising: (a) positioning the end portion of said cylindrical tube between a pair of inwardly opposed die blocks movable between an open position and a closed position, each of said die blocks comprising an array of raised cutters and recessed pockets, each of said cutters of one of said die blocks adapted to be closely received into an opposed pocket of the other of said die blocks when said die blocks are moved from said open position to said closed position; (b) moving said die blocks from said open position to said closed position to sequentially crush said end portion to a substantially flat configuration and sever it into a plurality of coupons; and (c) repeating steps (a) and (b) until said cylindrical tube is severed into coupons.

In accordance with another aspect of the invention, there is provided a method for reducing the disposal volume of irradiated radioactive nuclear reactor cylindrical tubes comprising: (a) engaging the end of a selected tube at the reactor face and advancing a portion of said selected tube out of said reactor; (b) positioning the end portion of said cylindrical tube between a pair of inwardly opposed die blocks movable between an open position and a closed position, each of said die blocks comprising an array of raised cutters and recessed pockets, each of said cutters of one of said die blocks adapted to be closely received into an opposed pocket of the other of said die blocks when said die blocks are moved from said open position to said closed position; (c) moving said die blocks from said open position to said closed position to sequentially crush said end portion to a substantially flat configuration and sever it into a plurality of coupons; and (d), repeating steps (b) and (c) until said cylindrical tube is severed into coupons.

The construction and method of operation of the invention will be best understood from the following description of specific embodiments when read in connection with the accompanying drawings.

DESCRIPTION OF THE PREFERRED EMBODIMENTS

Figure 1:
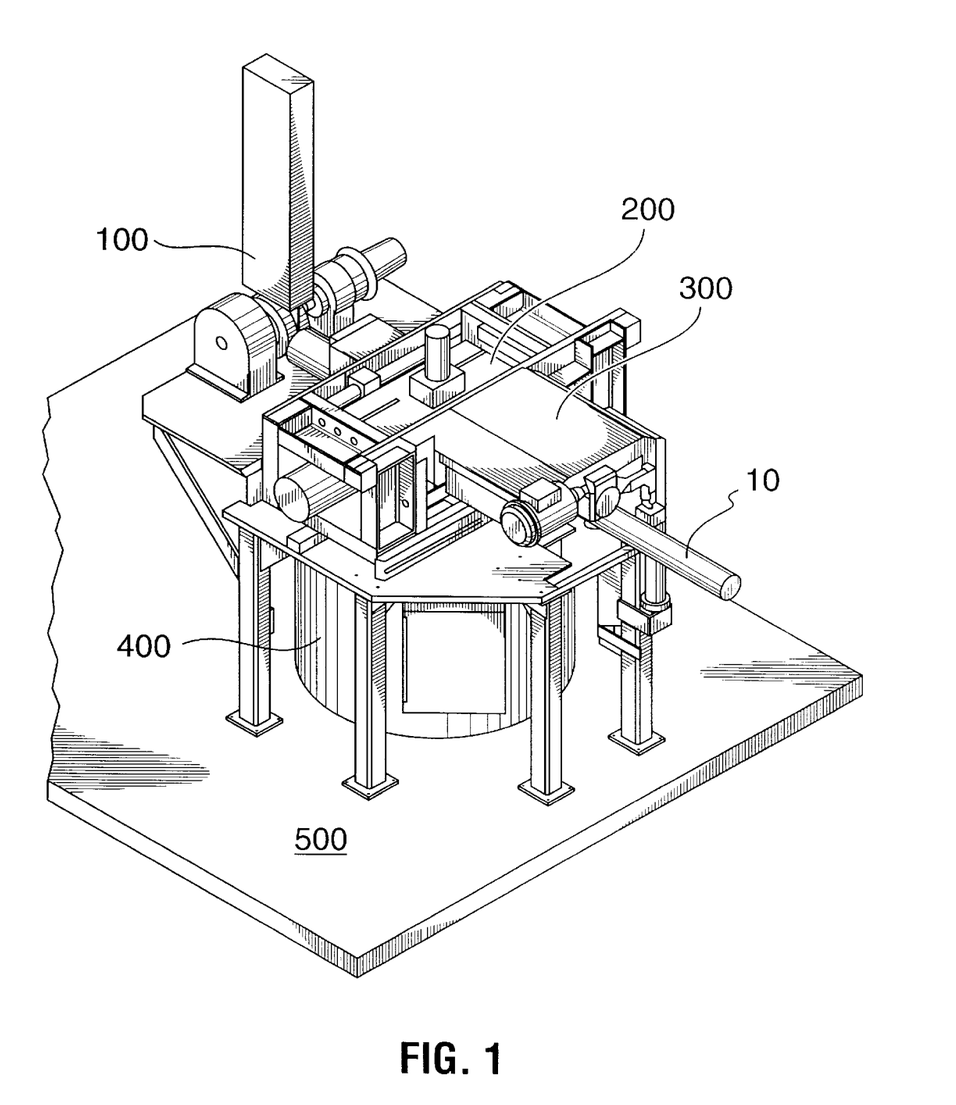
FIG. 1 is a perspective view of an embodiment of the disposal volume reduction system of the present invention.

Referring to FIG. 1, the checkerboard shear volume reduction system of the present invention is shown. The system comprises retraction unit 100, press assembly 200, feeder assembly 300 and flask assembly 400. The pressure tube volume reduction system is mounted on work platform 500, which is capable of horizontal lateral motion to allow remote movement between lattice sites and inboard/outboard motion to allow movement toward and away from the lattice sheet, as well as vertical motion to allow movement up and down the lattice sheet. Cylindrical pressure tube 10 is shown in FIG. 1 in position for volume reduction.

Figure 2:
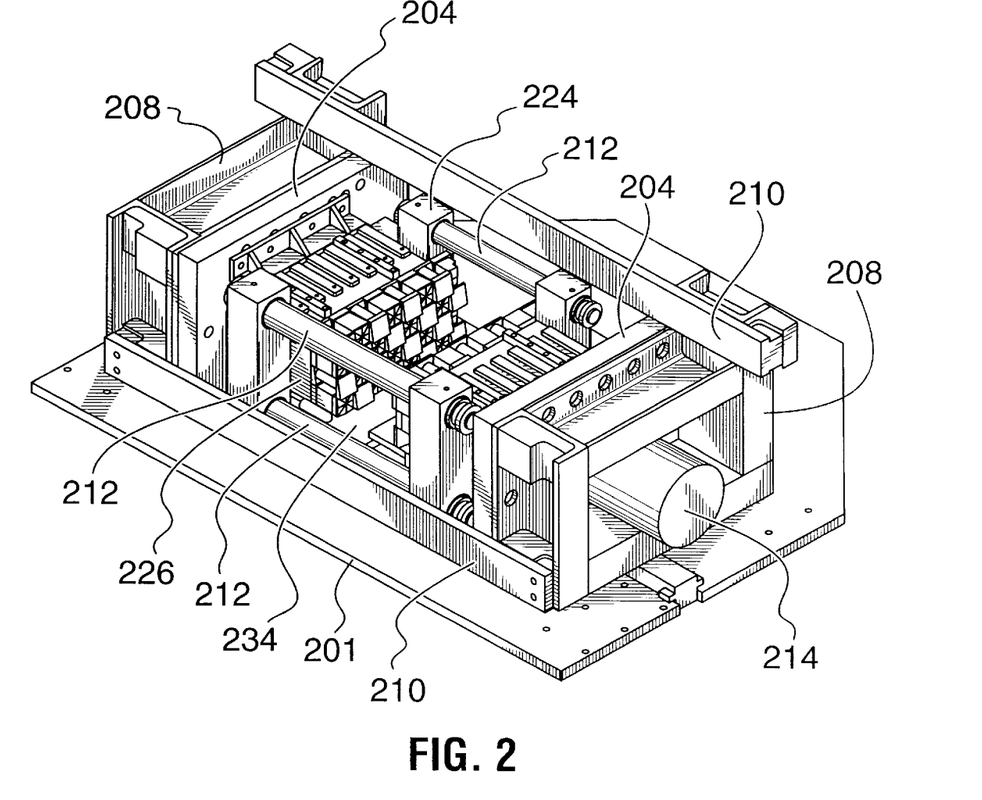
FIG. 2 is a perspective view of the press assembly.
Figure 3:
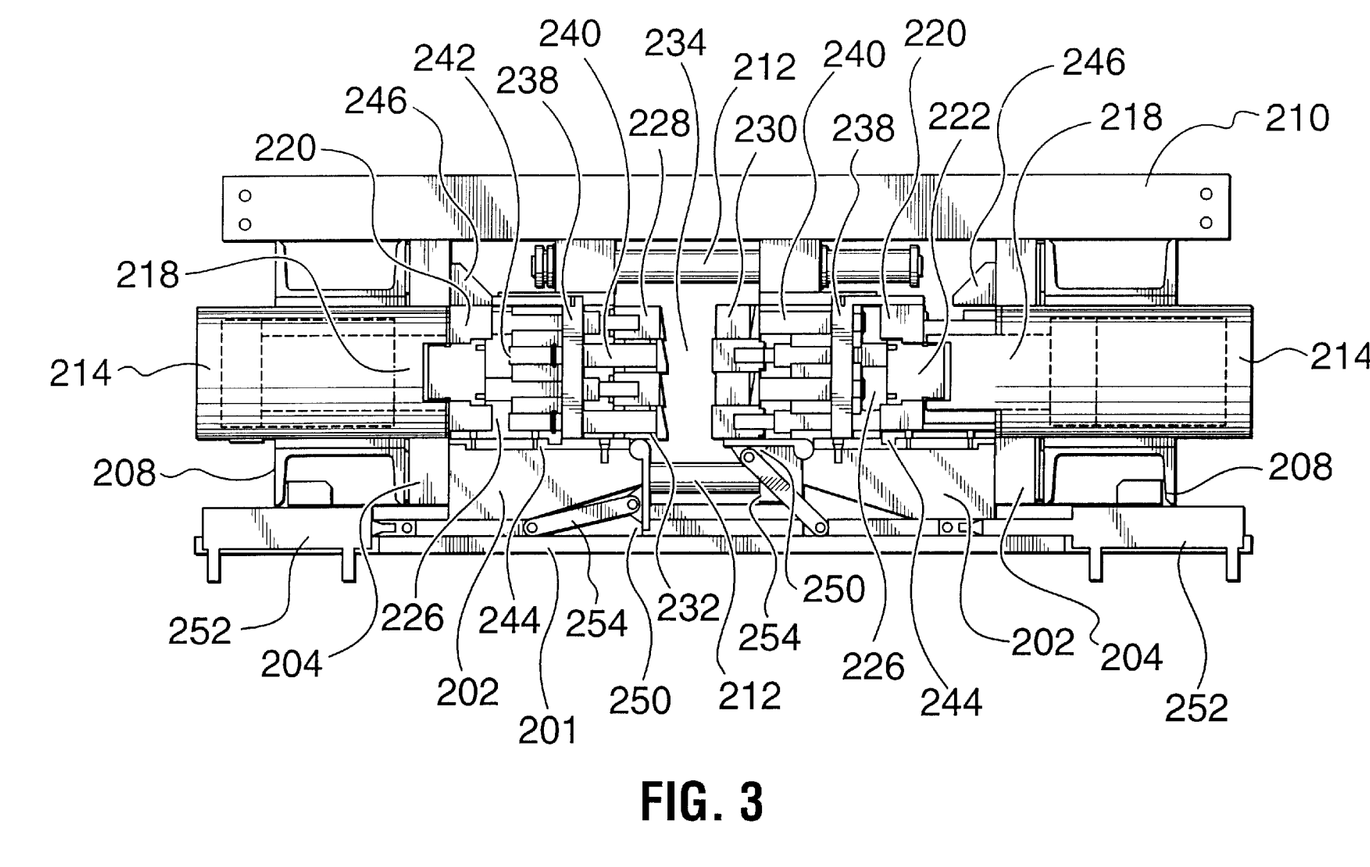
FIG. 3 is an elevation view of the press assembly.

Referring now to FIGS. 2 and 3, press assembly 200 is shown in greater detail. Press assembly 200 comprises base 202 and end plates 204. End plates 204 are retained in fixed relation to one another by box frames 208 and bottom plate 201 and by parallel straps 210. Straps 210 have a bolted connection at the four corners of box frames 208.

Hydraulic cylinders 214 are fixedly mounted to end plates 204 with the cylinder rods 218 extending inwardly from end plates 204. Cylinder rods 218 are connected at their distal ends to platens 220 by cylinder bolt 222. Platens 220 have a bolted connection to dieblocks 226. Dieblocks 226 are mounted on guide rods 212 through bores 224 at their four corners and are adapted for reciprocal horizontal sliding movement toward and away from one another under control of hydraulic cylinders 214. Opposed die blocks 226 are carried on the inward facing surfaces of platens 220. Die blocks 226 contain an interlaced set of tool steel shear blades, details of which can be seen in FIG. 4.

Figure 4:
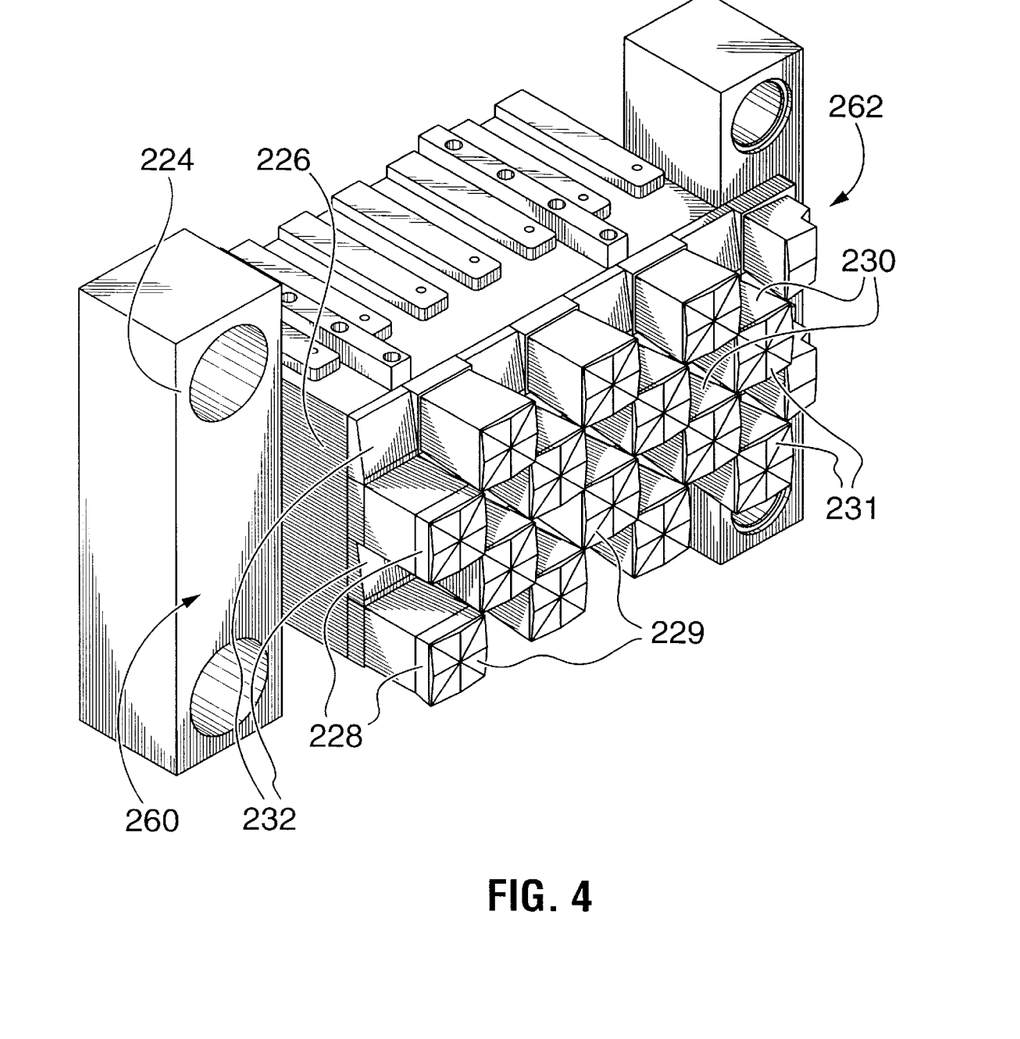
FIG. 4 is a perspective view showing the checkerboard die block and cutter arrangement.

Referring now to FIG. 4 details of die blocks 226 can be seen. Each die block 226 is machined to accept a checkerboard pattern of raised cutters 228 and recessed pockets 230 containing ejectors 232. When brought into face-to-face relation, the raised cutters 228 of one opposed die block 226 are received in the pockets 230 containing ejectors 232 of the other opposed die 226. While the checkerboard pattern shown in FIG. 4 comprises a 4×8 array of alternating raised cutters 228 and recessed pockets 230, it will be appreciated that other patterns can be selected depending upon the size and shape of the cylindrical material to be processed.

Cutters 228 have inward facing surfaces 229 surrounded by cutting edges 231. Surfaces 229 are profiled such that the midpoint of each top and bottom edge 231 is raised. The inward facing surfaces of ejectors 232 are angled to facilitate material ejection.

The distance that cutters 228 protrude inwardly from die block 226 reduces uniformly across the face of the die block. In particular, cutters 228 that are located closer to the side 260 of die block 226 that is farther away from the reactor face protrude inwardly a greater distance than cutters 228 located closer to the side 262 of die block 226 that at the edge closer to the reactor face. The result is that opposed cutters 228 and pockets 230 farther from the reactor face are in closer spaced relation than opposed cutters 228 and pockets 230 nearer to the reactor face. Accordingly, crushing and shearing will take place sequentially starting at the end of cylindrical tube 10 and proceeding toward the reactor face.

Referring again to FIG. 3, the ejectors 232 comprise rods 240 which extend through horizontal bores 242 in die blocks 226. Pairs of ejector rods 240 that are vertically aligned are connected at their ends to an inverted 'L-shaped' ejector crossbar 238 which is carried in an elongated slot in die block 226. Lower crossbar stops 244 are horizontally disposed below die blocks 226 on the upper surface of the base 202 and upper crossbar stops 246 are horizontally disposed on the inward facing surfaces end plates 204. Ejector crossbars 238 are sized such that their ends engage crossbar stop members 244 and 246. As die blocks 226 are draw away from one another when hydraulic cylinders 214 are retracted, ejector rods 240 and ejector crossbars 238 are carried toward end plates 204 until ejector crossbars 238 engage lower and upper crossbar stop members 244 and 246. Continued retraction of hydraulic cylinders 214 will draw die blocks 226 between crossbar stop members 244 and 246, while ejector crossbars 238 remain stopped against crossbar stop members 244 and 246. This relative motion of die block 226 and ejector crossbars 238 causes ejectors 232 to be forced outward in pockets 230 in die blocks 226 to clear any undislodged cut material. Manual operation of ejectors 232 is possible to help remove jammed material from die blocks 226.

Press assembly 200 further includes lower doors 250 mounted immediately below die blocks 226 and above flask assembly 400. Doors 250 are actuated by hydraulic cylinders 252 and linkage 254, and serve two main purposes. First, they keep all crushed/sheared material within the press area during the full crush/shear operation to ensure complete volume reduction. Secondly, they provide a means to close off the opening below press assembly 200 during flask changeout. This reduces the potential spread of contamination, eliminates the possibility of a small pressure tube piece falling from the system during flask changes, and allows a flask change to be performed with the pressure tube inside the volume reduction unit in a recovery-mode situation. For purposes of illustration, one door 250 is shown in the open position and the other in the closed position. It will be appreciated that in practice, both doors 250 are moved to the closed position during the shearing operation and both doors 250 are moved to the open position to permit discharge of sheared material.

Figure 5:
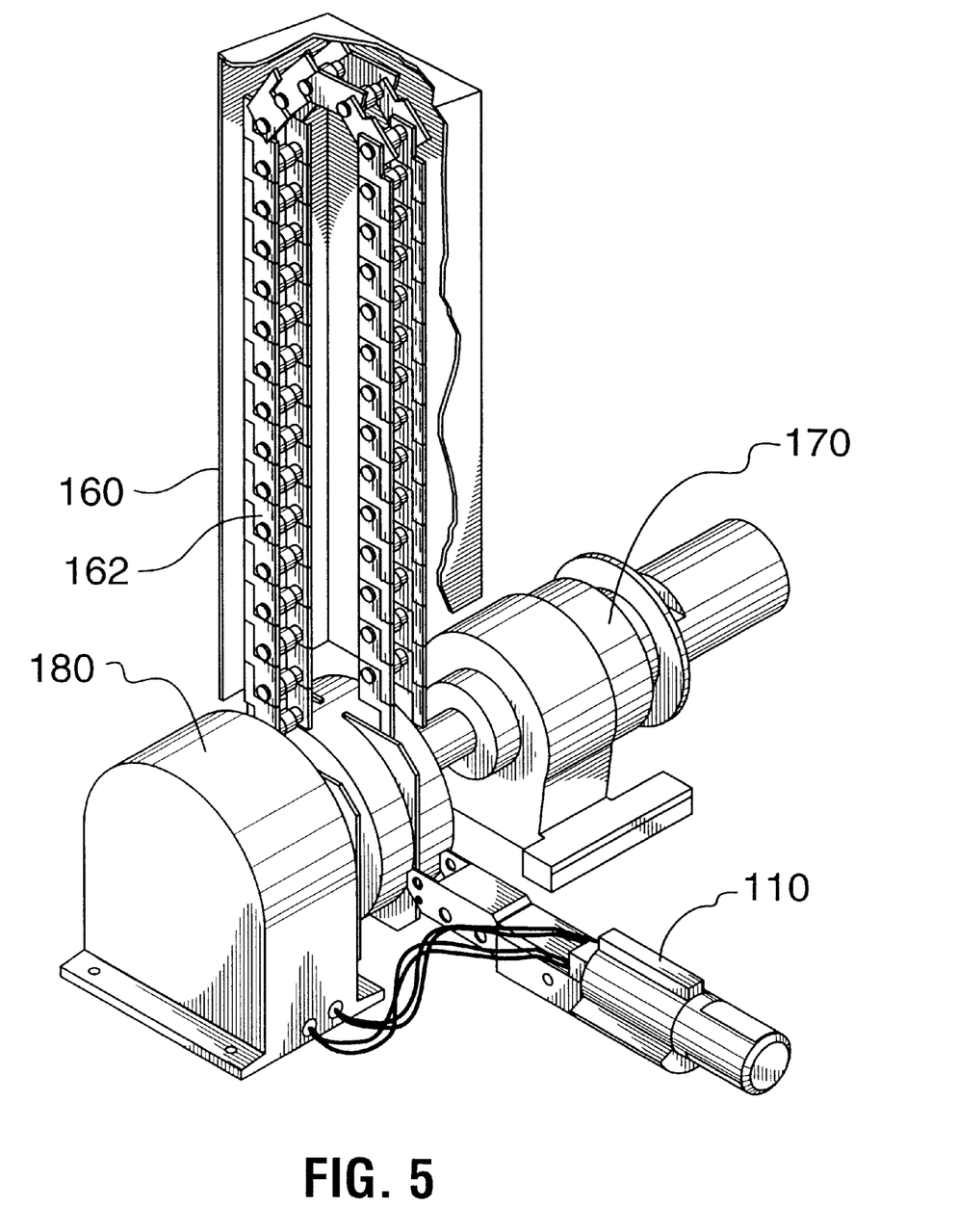
FIG. 5 is perspective view of the retraction unit.

Referring now to FIG. 5, the retraction unit assembly 100 is shown in greater detail. Retraction unit assembly 100 is used to initially draw the pressure tube into the volume reduction system for processing. Retraction unit 100 is mounted immediately outboard of press assembly 200 and comprises retraction plug 110, chain magazine 160, drive motor 170 and hydraulic hose reel 180. Chain magazine 160 comprises a Serapid™ chain 162 which is powered in either direction by drive motor 170. Serapid™ chain 162 is a machine chain that can only flex in one direction, allowing it to be used under either tension or compression. Because Serapid™ chain 162 can support both tension and compression loads, it may be used to pull the pressure tube out of the calandria tube, or push the pressure tube back into the calandria tube under certain back-out scenarios.

Retraction plug 110 is mounted at the end of serapid chain 162. When Serapid™ chain 162 is extended by drive motor 170, retraction plug 110 is advanced through gap 234 between opposed die blocks 226 of press assembly 200, through feeder assembly 300 and into the end of the pressure tube to be removed.

Figure 6:
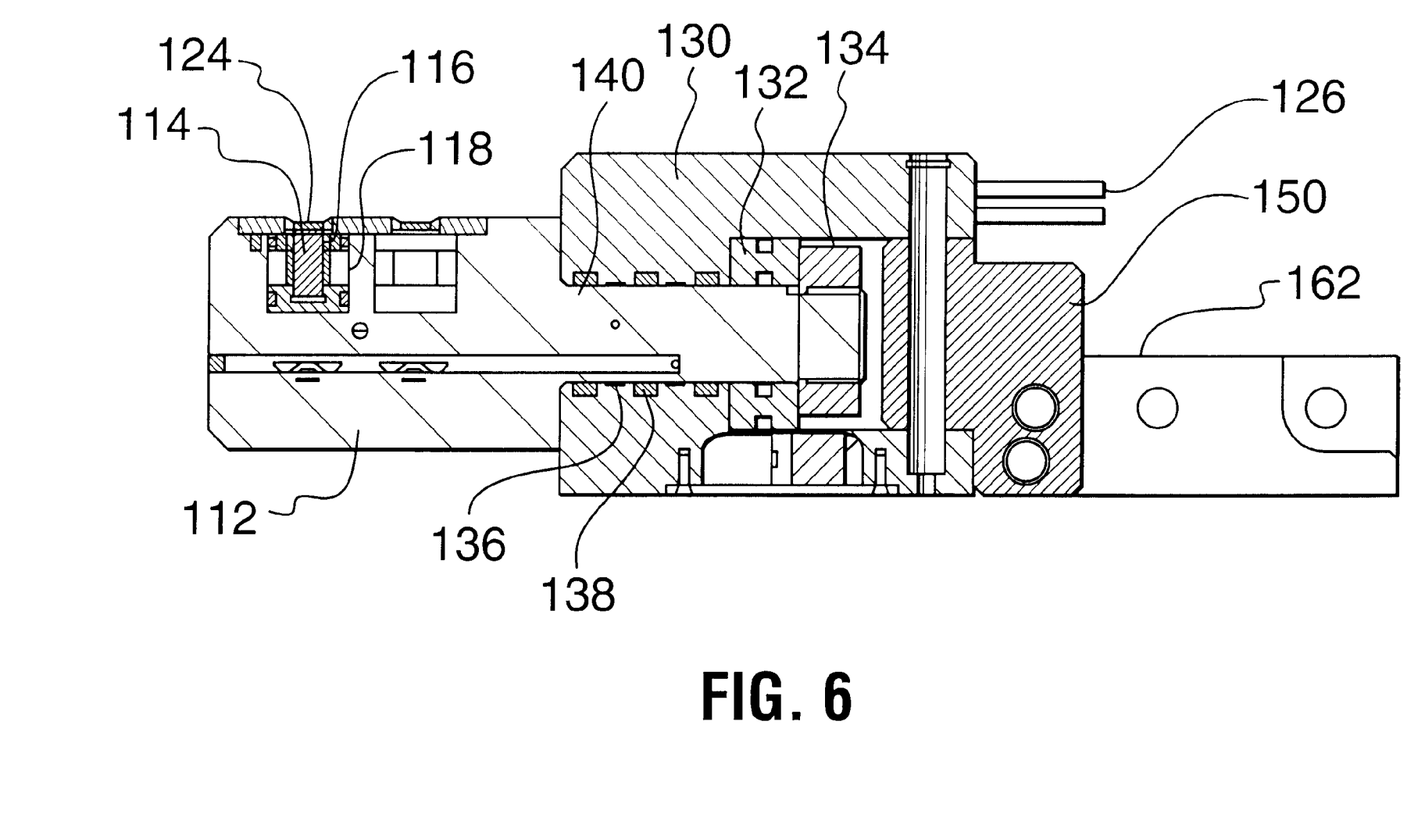
FIG. 6 is a side view in cross-section of the retraction plug.

As shown in FIG. 6, retraction plug 110 comprises nose 112 sized to be closely received inside the end of the pressure tube to be removed. Fingers 114 are fixedly mounted in radially disposed hydraulic pistons 116. Radially disposed hydraulic cylinder bores 118 machined in nose 112 house the hydraulic pistons 116. Hydraulic lines 126 extend from hose reel 180 to hydraulic cylinder bores 118. When retraction plug 110 is engaged in the end of the pressure tube to be removed, hydraulic pressure is applied to hydraulic cylinder bores 118, hydraulic pistons 116 and fingers 114 are extended radially outward into gripping engagement with the inside walls of the pressure tube to be removed. Ends 124 of fingers 114 can be bevelled, pointed or have other surface treatment to improve engagement with the pressure tube. Nose 112 is secured axially to retraction plug base 130 by means of thrust bearing 132 and nut 134. Nose 112 is able to rotate about its axis with respect to retraction plug base 130 to allow rotation of pressure tube during retraction from reactor. Oil passage grooves 136 and O-ring seals 138 provide for hydraulic connection across rotary interface 140 between nose 112 and retraction plug base 130. Adaptor block 150 connects serapid chain 162 to retraction plug base 130.

Figure 7:
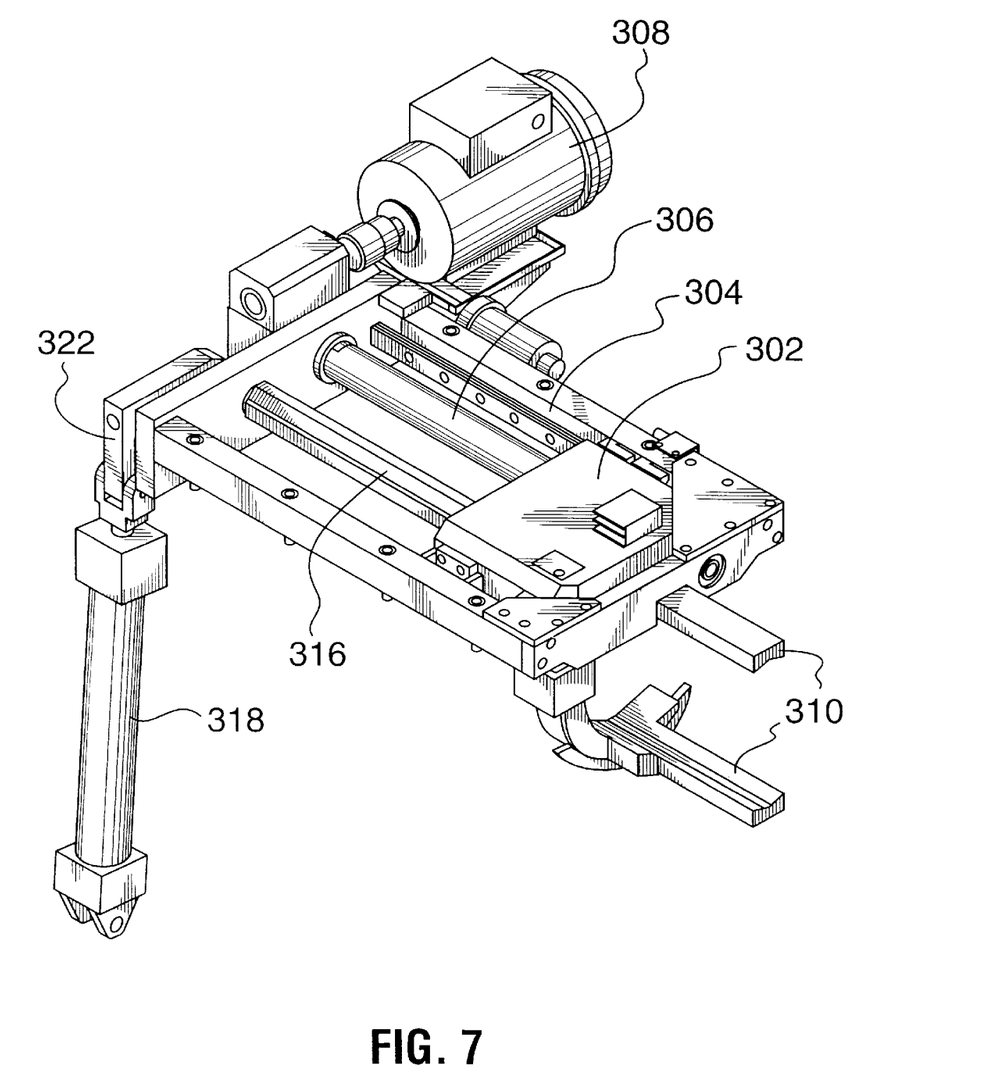
FIG. 7 is a perspective view of the feeder assembly.
Figure 8:
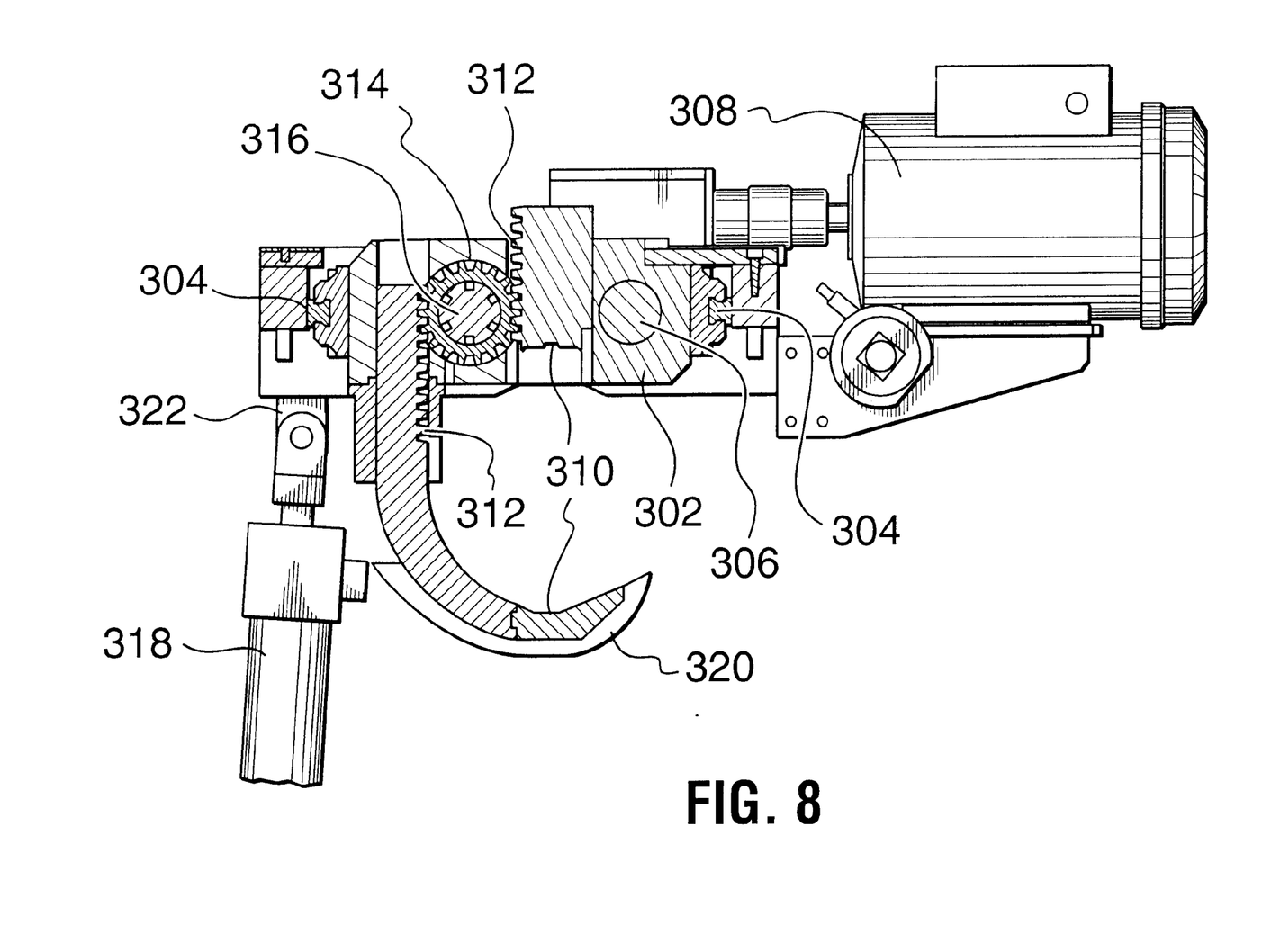
FIG. 8 is an elevation view in part cross-section of the feeder assembly.

Referring now to FIGS. 7 and 8, feeder assembly 300 is shown in greater detail. Feeder assembly 300 comprises carriage 302 which is slidably mounted for reversible longitudinal movement on linear rails 304. Carriage 302 is driven over rails 304 by ball screw 306 turned by electric motor 308. Grippers 310 are horizontally disposed above and below the longitudinal axis of the pressure tube being processed. Grippers 310 are driven by a double rack 312 with common single pinion 314, actuated by hydraulic cylinder 318. Pinion 314 is mounted on ball spline 316 to allow it to travel with carriage 302 under load.

Feeder assembly 300 functions to feed the pressure tube from the reactor face into press assembly 200 after each crush/shear cycle. This feeding motion is achieved by driving carriage 302 to its inboard position (i.e. toward the reactor face) by means of motor 308 and closing grippers 310 onto the outside of the pressure tube. Carriage 302 is then driven in the opposite direction which positions the end of the pressure tube into press assembly 200. Grippers 310 operate vertically, which allows them to travel into the press assembly and maintain hold of the pressure tube until cutters 228 make contact. Manual actuation of the pressure tube feeder grippers 310 and carriage 302 via ball screw 306 and hydraulic cylinder bracket 322 is possible to aid in recovery.

Wiper 320 is mounted on lower gripper 310 and is used to sweep into the flask any debris that may collect in the feed assembly area.

Figure 9:
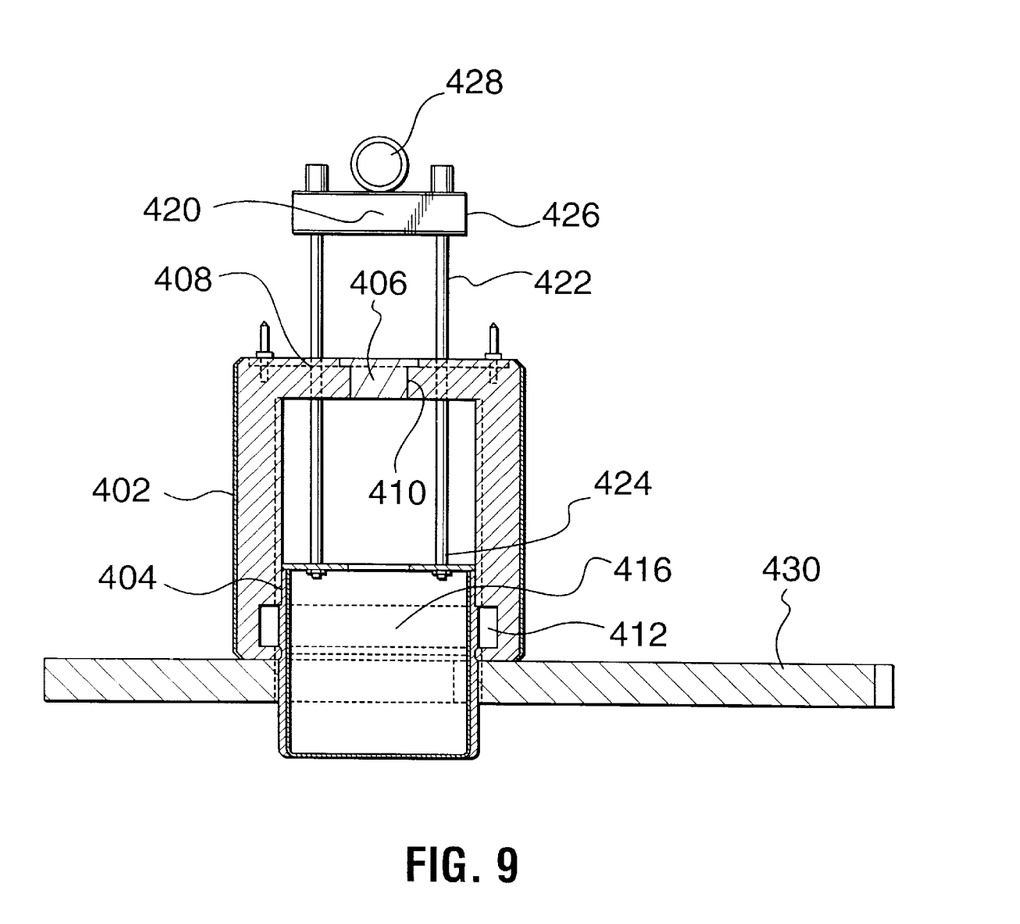
FIG. 9 is an elevation view in cross-section of the flask assembly during unloading.

Referring now to FIG. 9, flask assembly 400 is shown in greater detail. Flask assembly 400 comprises cylindrical flask 402 and cylindrical liner 404. Top loading door 406 is mounted in top wall 408 of flask 402 for horizontal sliding movement. Top loading door 406 can be opened by sliding it by means of suitable control (e.g. hydraulic) to expose a longitudinal rectangular opening 410 directly below the area of die blocks 226. Coupons that are cut by the action of dies 226 fall through opening 410 into liner 404.

Liner 404 is a single-use (disposable) container formed of stainless steel. Once liner 404 is filled with coupons, liner 404 is removed from flask 402 for permanent disposal. Liner 404 is mounted within flask 402 and is retained by disposal door 412. Disposal door 412 is mounted in bottom of flask 402 for horizontal sliding movement. Disposal door 412 can be opened by sliding it by means of suitable control (e.g. hydraulic) to expose circular opening 416 adjacent the underside of liner 404.

Flask 402 is first removed from the volume reduction system of the present invention to the disposal area 430. Liner disposal tool 420 comprises lifting rods 422 which are removably attached at their lower ends to the top wall 424 of liner 404, by suitable means, for example by threading engagement. Lifting rods 422 pass through openings in top wall 408 and are connected at their uppers ends by cross-bar 426. Liner 404 is disposed of by attaching lifting rods 422, raising liner 404 by hoisting cross-bar 426 at lifting eye 428, sliding open disposal door 412, and lowering liner 404 into the disposal area. A fresh liner 404 can then be raised into flask 402 and the flask reassembled into the volume reduction system of the present invention. Flask size may be varied to meet shielding requirements and the available lifting capacity of the work platform.

The operation of the present invention is controlled by a PLC-based controller, programmed to run automated routines, with interlocks to prevent out-of-sequence events. The main control station is located in the reactor vault but away from the highest radiation fields. Remote manual control of all functions will be possible. A satellite control panel may be located near the volume reduction unit.

The operation of the pressure tube volume reduction system of the present invention will now be described. Prior to the start of the pressure tube volume reduction process, all end fittings and feeders are removed. Work may be performed on each reactor face in parallel. The volume reduction systems are installed on the work platforms and control stations are set up in the reactor vault. Lattice tube and bellows protective sleeves are installed on all channels with temporary lattice tube shield plugs (or equivalent).

An empty flask assembly 400 is loaded on the volume reduction unit. Once the channel location is determined, the volume reduction system is aligned with the channel and the lattice tube shield plug is removed. The volume reduction system is finally aligned with and locked on the channel using any standard mechanical latch to the lattice tube protective sleeve. Serapid™ chain 162 is driven forward by hydraulic motor 170 to advance retraction plug 110 and insert it into the end of the pressure tube. Fingers 114 are engaged to the end of the pressure tube and serapid chain 162 is driven in the reverse direction to withdraw the end of the pressure tube through gap 234 between die blocks 226. Carriage 302 is driven to the forward inboard limit and pressure tube feeder grippers 310 are closed to engage the pressure tube. Lower press doors 250 are closed. Fingers 114 are retracted to disengage from the pressure tube and Serapid™ chain 162 is further driven in reverse direction to move the retraction plug 110 outboard of gap 324. Die blocks 226 are driven together to the fully closed position. This causes a 14 7/16 inch length of pressure tube in gap 234 to first be crushed flat between inward facing surfaces 229 and then sheared by cutters 228 into 2 1/16 inch square coupons while the pressure tube remains centred on the reactor lattice site during the operation. The lower press doors 250 are opened and dies 226 are fully opened to eject all pressure tube coupons into flask 402 through opening 410.

Carriage 302 is driven away from the reactor face until the end of the pressure tube is again positioned between die blocks 226. Lower press doors 250 are closed and die blocks 226 are driven together to the 50% closed position. Pressure tube feeder grippers 310 are then opened and die blocks 226 are fully closed while carriage 302 is driven to the full inboard position. Pressure tube feeder grippers 310 are closed to engage the pressure tube and lower press doors 250 are opened. Die blocks 226 are fully opened to eject all pressure tube coupons into flask 402.

The press/gripper cycling is repeated until the complete pressure tube is processed into coupons. Thereafter, the system is disengaged from the channel, the lattice tube shield plug is replaced, the number of processed pressure tubes in the flask is confirmed and the volume reduction system is aligned with and locked on the next channel to be processed.

Once flask 402 is full, it is disengaged from the volume reduction system and is lifted off the work platform. An empty flask is then installed under the volume reduction system and the process is continued until all pressure tubes have been processed.

The interior space of the volume reduction system, including the press assembly and feeder assembly interior volume, is maintained under a slight negative pressure to prevent the spread of contamination by any oxide dust or other small particles generated. A shielded filter is used to collect the active dust.

The stepped process carried out by the method of the present invention allows the process to be stopped indefinitely at any time and restarted without problem. This is useful for dealing with repairs or malfunctions and also such incidences as power outages, shift changes or non-volume reduction related interruptions.

Retraction unit 100, press assembly 200 and feeder assembly 300 are all of a modular design to allow quick field replacement of an individual sub-system rather than the complete unit, thereby minimizing contamination spread and lost time due to repair. Because all hydraulic cylinders, electric motors and other actuators are outside shielding, they may be repaired or replaced if required with radioactive pressure tube present in the volume reduction system. This allows repair or maintenance activities to be performed in the event a malfunction occurs while radioactive material is still present in the system. This greatly simplifies recovery scenarios as removal of the radioactive pressure tube by a back-out means is not required in order to effect repair or maintenance operations. Moreover, the compact modular design of the volume reduction system of the present invention permits the components thereof to be easily fitted with shielding. Top shielding elements can be seen in FIG. 1 over the press and feeder assemblies, but have been omitted from the balance if the figures for purposes of illustration.

As noted above, the volume reduction process of the present invention combines the crushing of the pressure tube flat and shearing on a checkerboard grid of multiple intersecting planes. Crushing generally causes the pressure tube to break cleanly along its sides perpendicular to the crushing force, separating the pressure tube into two complete halves that remain intact. A smooth transition from the crushed to uncrushed sections is produced immediately inboard of die blocks 226. Materials subjected to high levels of irradiation undergo substantial material property changes. For Zr-2.5%Nb pressure tubes, this includes an increase in the ultimate tensile strength and a reduction in total elongation (ductility).

The surface profiling of cutters 228 produces a cutting edge that effects a progressive shear action which reduces the maximum shear force required. Moreover, the variation in the extent of the protrusion of the cutters 228 inwardly from die blocks 226 effects a sequential shearing action with closer spaced cutters near the end of the tube acting before more widely spaced cutters farther from the end of the tube. This also reduces maximum shear force. It will be understood that surface profiles other than that shown in FIG. 3 and variations in opposed cutter spacing can be used to reduce maximum shear force. In addition, cutters 228 need not be square but can be configured to produce coupons of other shapes.

The one-step crushing and shearing process of the present invention to reduce the pressure tubes into small flat coupons has a number of advantages. It has minimal material handling requirements so that no additional equipment is required to flask the irradiated waste and no subsequent material handling is required. The coupons may simply drop into the flask in random order, avoiding the complexity and potential risks of systems which require mechanisms to align or stack material. This simplifies the design, eliminates possible failure modes and maintains a compact overall size. Secondly, the form of the waste material does not constrain the subsequent shielded flask size or shape, so that an optimal flask size and shape can be chosen to receive the required amount of material to optimize material handling, weight, transportation, disposal and storage considerations. For example, the reduction in gross volume of the waste material allows the use of a smaller and lighter shielded flask for handling to the disposal site, thereby speeding up the overall removal/disposal task, making it more economically viable. The volume reduction system of the present invention is compact and light enough to be used in situ at various field locations while still being completely shielded to enable personnel to be present at or near the equipment.

While the volume reduction system of the present invention has been described with respect to use with pressure tubes, it can also be used to remove and process calandria tubes or other hollow cylindrical components of varied cross-sectional shapes. Removal of the calandria tubes may be done separately from pressure tubes, or simultaneously. Thus, the stroke of feeder grippers 310 and the stroke of dies 226 can be sized to accommodate the larger diameter calandria tubes. Further scaling is possible to adapt the system for processing other components. The checkerboard shear technique of the present invention is capable of processing components with thick cross-sections (up to 10 mm has been successfully tested) and can be readily scaled up or down to match the requirements of the application. The volume reduction system of the present invention can have other commercial applications such as the refurbishment and/or decommissioning of radioactive sites as well as volume reduction applications for non-irradiated components in nonnuclear industries such as waste management industries.

We claim:

1. An apparatus for reducing the disposal volume of an elongated cylindrical tube comprising a pair of inwardly opposed die blocks, means for moving said die blocks between an open position and a closed position, and feeder means for positioning an end portion of said cylindrical tube between said die blocks in said open position, each of said die blocks comprising an array of raised cutters and recessed pockets, each of said cutters of one of said die blocks adapted to be closely received into an opposed pocket of the other of said die blocks when said die blocks are moved from said open position to said closed position to sequentially crush said end portion to a substantially flat configuration and sever it into a plurality of coupons.

2. The apparatus according to claim 1 wherein each of said cutters has an inwardly facing surface for crushing engagement with said cylindrical component and a cutting edge about the perimeter of said surface, said cutting edge being profiled to sever one of said coupons by a progressive shearing action.

3. The apparatus according to claim 2 wherein said cutting edge is substantially square.

4. The apparatus according to claim 2 wherein the spacing between the cutting edges of said cutters and the corresponding opposed pockets varies over the array such that coupons are sheared sequentially as said die blocks are moved from said open position to said closed position.

5. The apparatus of claim 2 wherein the spacing between the cutting edges of said cutters and the corresponding opposed pockets increases progressively over the array such that coupons are sheared sequentially starting from the end of said cylindrical tube.

6. The apparatus according to claim 1 including an ejector in each of said pockets for ejecting a severed coupon.

7. The apparatus according to claim 6 when said ejector is actuated in response to movement of said die blocks from the closed position to the open position.

8. The apparatus according to claim 7 wherein said each die block is mounted for movement in relation to a fixed support, said support comprising a stop means, said ejector comprising an elongated fixed element slidably mounted through said die block and extending between said pocket and the outside of said die block, the outside end of said ejector positioned to engage said stop means when said die block is moved from said closed position to said open position whereby the other end is extended into said pocket into contact with said coupon.

9. The apparatus according to claim 1 wherein said die blocks are moved between said open and closed positions by hydraulic cylinders mounted to said fixed support.

10. An apparatus for reducing the disposal volume of irradiated radioactive nuclear reactor cylindrical tubes comprising:
   a movable mounting base adapted to be operatively positioned adjacent a reactor face at selected tube positions;
   a feeder unit mounted on said base for engaging and advancing said selected tube out of said reactor;
   a press assembly mounted on said base comprising a pair of inwardly opposed die blocks and means for moving said die blocks between an open position and a closed position, said die blocks being positioned to receive therebetween in said open position the end portion of said selected tube, each of said die blocks comprising an array of raised cutters and recessed pockets, each of said cutters of one of said die blocks adapted to be closely received into an opposed pocket of the other of said die blocks, whereby when said die blocks are moved from said open position to said closed position, said end portion is sequentially crushed to a substantially flat configuration and severed into a plurality of coupons.

11. The apparatus according to claim 10 further including a retraction unit mounted on said base for engaging the end of said selected tube and withdrawing it from said reactor face into position for operative engagement by said feeder means.

12. The apparatus according to claim 10 further including a removable receptacle positioned below said die blocks for receiving said severed coupons.

13. The apparatus according to claim 12 further including a door means positioned below said press assembly and above said receptacle, said door means being selectively movable from a closed position for receiving said severed coupons to an open position for discharging said coupons into said removable receptacle.

14. The apparatus according to claim 10 wherein each of said cutters has an inwardly facing surface for crushing engagement with said tube and a cutting edge about the perimeter of said surface, said cutting edge being profiled to sever one of said coupons by a progressive shearing action.

15. The apparatus according to claim 14 wherein said cutting edge is substantially square.

16. The apparatus according to claim 14 wherein the spacing between the cutting edges of said cutters and the corresponding opposed pockets varies over the array such that coupons are sheared sequentially as said die blocks are moved from said open position to said closed position.

17. The apparatus according to claim 14 wherein the spacing between the cutting edges of said cutters and the corresponding opposed pockets increases progressively across the array such that coupons are sheared sequentially starting from the end of said cylindrical tube.

18. The apparatus according to claim 10 including an ejector in each of said pockets for ejecting a severed coupon.

19. The apparatus according to claim 18 when said ejector is actuated in response to movement of said die blocks from the closed position to the open position.

20. The apparatus according to claim 19 including a stop means fixed to said base, said ejectors comprising an elongated fixed elements slidably mounted through said die block and extending between said pockets and the outside of said die block, the outside ends of said ejector positioned to engage said stop means when said die block is moved from said closed position to said open position whereby the other ends are extended into said pockets into contact with said coupons.

21. The apparatus according to claim 10 wherein said die blocks are moved between said open and closed positions by hydraulic cylinders mounted to said fixed support.

22. A method for reducing the disposal volume of an elongated cylindrical tube comprising:
   (a) positioning the end portion of said cylindrical tube between a pair of inwardly opposed die blocks movable between an open position and a closed position, each of said die blocks comprising an array of raised cutters and recessed pockets, each of said cutters of one of said die blocks adapted to be closely received into an opposed pocket of the other of said die blocks when said die blocks are moved from said open position to said closed position,;
   (b) moving said die blocks from said open position to said closed position to sequentially crush said end portion to a substantially flat configuration and sever it into a plurality of coupons;
   (c) repeating steps (a) and (b) until said cylindrical tube is severed into coupons.

23. The method according to claim 22 wherein each of said cutters has an inwardly facing surface for crushing engagement with said cylindrical component and a cutting edge about the perimeter of said surface, said cutting edge being profiled to sever one of said coupons by a progressive shearing action.

24. The method according to claim 23 wherein said cutting edge is substantially square.

25. The method according to claim 23 wherein the spacing between the cutting edges of said cutters and the corresponding opposed pockets varies over the array such that coupons are sheared sequentially as said die blocks are moved from said open position to said closed position.

26. The method of claim 23 wherein the spacing between the cutting edges of said cutters and the corresponding opposed pockets increases progressively over the array such that coupons are sheared sequentially starting from the end of said cylindrical tube.

27. A method for reducing the disposal volume of irradiated radioactive nuclear reactor cylindrical tubes comprising:
   (a) engaging the end of a selected tube at the reactor face and advancing a portion of said selected tube out of said reactor;
   (b) positioning the end portion of said cylindrical tube between a pair of inwardly opposed die blocks movable between an open position and a closed position, each of said die blocks comprising an array of raised cutters and recessed pockets, each of said cutters of one of said die blocks adapted to be closely received into an opposed pocket of the other of said die blocks when said die blocks are moved from said open position to said closed position;

(c) moving said die blocks from said open position to said closed position to sequentially crush said end portion to a substantially flat configuration and sever it into a plurality of coupons;

(d) repeating steps (b) and (c) until said cylindrical tube is severed into coupons.

28. The method according to claim 27 wherein each of said cutters has an inwardly facing surface for crushing engagement with said cylindrical component and a cutting edge about the perimeter of said surface, said cutting edge being profiled to sever one of said coupons by a progressive shearing action.

29. The method according to claim 28 wherein said cutting edge is substantially square.

30. The method according to claim 28 wherein the spacing between the cutting edges of said cutters and the corresponding opposed pockets varies over the array such that coupons are sheared sequentially as said die blocks are moved from said open position to said closed position.

31. The method of claim 28 wherein the spacing between the cutting edges of said cutters and the corresponding opposed pockets increases progressively over the array such that coupons are sheared sequentially starting from the end of said cylindrical tube.

32. The method according to claim 27 wherein moving of said die blocks between said open and closed positions is by hydraulic cylinders.

33. The method according to claim 30 including receiving said severed coupons in a receptacle positioned below said die blocks.

* * * * *